(12) United States Patent
Jha et al.

(10) Patent No.: US 12,017,793 B2
(45) Date of Patent: Jun. 25, 2024

(54) EXTERIOR AIRCRAFT LIGHT WITH INTEGRATED LIGHT OUTPUT MONITORING, AIRCRAFT COMPRISING SUCH EXTERIOR AIRCRAFT LIGHT, AND METHOD FOR MONITORING A LIGHT OUTPUT OF AN EXTERIOR AIRCRAFT LIGHT

(71) Applicant: Goodrich Lighting Systems GmbH & Co. KG, Lippstadt (DE)

(72) Inventors: Anil Kumar Jha, Lippstadt (DE); Andre Hessling-von Heimendahl, Koblenz (DE); Marion Depta, Lippstadt (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 18/480,221

(22) Filed: Oct. 3, 2023

(65) Prior Publication Data
US 2024/0116651 A1  Apr. 11, 2024

(30) Foreign Application Priority Data
Oct. 6, 2022 (EP) .................... 22200159

(51) Int. Cl.
| | |
|---|---|
| *B64D 47/06* | (2006.01) |
| *B64D 47/04* | (2006.01) |
| *F21V 7/00* | (2006.01) |
| *F21W 107/30* | (2018.01) |

(Continued)

(52) U.S. Cl.
CPC ............. *B64D 47/06* (2013.01); *B64D 47/04* (2013.01); *F21V 7/0091* (2013.01); *H05B 47/11* (2020.01); *B64D 2203/00* (2013.01); *F21W 2107/30* (2018.01); *F21Y 2115/10* (2016.08)

(58) Field of Classification Search
CPC .......... B64D 47/02–06; B64D 2203/00; F21V 7/0091; F21W 2107/30; F21Y 2115/10; H05B 47/11
See application file for complete search history.

(56) References Cited

U.S. PATENT DOCUMENTS

| | | | |
|---|---|---|---|
| 6,616,299 | B2 | 9/2003 | Martineau |
| 8,162,504 | B2 | 4/2012 | Zhang et al. |
| 8,573,815 | B2 | 11/2013 | Mallory et al. |

(Continued)

OTHER PUBLICATIONS

European Search Report for Application No. 22200159.6, dated Mar. 13, 2023, 5 pages.

*Primary Examiner* — Jason M Han
(74) *Attorney, Agent, or Firm* — CANTOR COLBURN LLP

(57) ABSTRACT

An exterior aircraft light with integrated light output monitoring includes a light source support, at least one light source, arranged on an outward facing side of the light source support, an aperture in the light source support, a light collection surface, arranged to direct an output monitoring light portion of the light, emitted by the at least one light source, through the aperture in a predefined angular range with respect to the light source support. The light also includes a light detector, arranged on a back side of the light source support, and a total internal reflection optical element, arranged to direct the output monitoring light portion, having travelled through the aperture in the predefined angular range with respect to the light source support, to the light detector via total internal reflection.

15 Claims, 4 Drawing Sheets

(51) Int. Cl.
*F21Y 115/10*       (2016.01)
*H05B 47/11*        (2020.01)

(56) References Cited

U.S. PATENT DOCUMENTS

| | | |
|---|---|---|
| 10,362,657 B2 | 7/2019 | Hessling-Von Heimendahl et al. |
| 11,225,336 B2 | 1/2022 | Hessling-Von Heimendahl et al. |
| 11,300,506 B2 | 4/2022 | Kawasaki et al. |
| 2002/0080023 A1 | 6/2002 | DeMarco et al. |
| 2020/0189766 A1 | 6/2020 | Jha |

EXTERIOR AIRCRAFT LIGHT WITH INTEGRATED LIGHT OUTPUT MONITORING, AIRCRAFT COMPRISING SUCH EXTERIOR AIRCRAFT LIGHT, AND METHOD FOR MONITORING A LIGHT OUTPUT OF AN EXTERIOR AIRCRAFT LIGHT

CROSS REFERENCE TO RELATED APPLICATIONS

This application claims priority to European Patent Application No. 22200159.6 filed Oct. 6, 2022, the entire contents of which is incorporated herein by reference.

FIELD OF THE INVENTION

The present invention relates to exterior aircraft lighting. In particular, it relates to the maintenance of exterior aircraft lights.

BACKGROUND

Almost all aircraft are equipped with exterior lighting systems. For example, large commercial aircraft have many different exterior lights. An exemplary group of exterior aircraft lights are lights for passive visibility, such as navigation lights, white strobe anti-collision lights, and red-flashing beacon lights. Another exemplary group of exterior aircraft lights are headlights that allow the pilots to view the area in front of them, when they are seated in the cockpit, such as taxi lights, take-off lights, landing lights, and runway turn-off lights. Yet another example of exterior aircraft lights are scan lights that allow the inspection of the aircraft structure in the dark, such as wing scan lights and engine scan lights. Further examples of exterior aircraft lights are cargo loading lights and logo lights.

Exterior aircraft lights are subject to deterioration of their light output over time. In particular, many modern light sources, as used in current exterior aircraft lights, are subject to a decrease in their output light intensity over time. In the context of LED-based light sources, said decrease is also referred to as aging of the LED(s). Thermal stresses may also have a detrimental effect on the output light intensity of the LEDs. The aging/degradation of the LED(s) may become so severe that the exterior aircraft light is no longer considered airworthy. Accordingly, it is desired to be able to monitor the aging/degradation of the lights source(s) of an exterior aircraft light.

In exterior aircraft lighting, monitoring the performance of the light source(s) is quite challenging. With exterior aircraft lights having fixed positions on the outside of the aircraft, they are subject to constantly changing ambient light conditions, making the determination of the performance of the light source(s) difficult. Also, the light source(s) is/are commonly placed behind a protective cover. While the protective cover is generally light transmissive, some of the light, as emitted by the light source(s) of the exterior aircraft light, may be reflected at the inner surface of the protective cover. Also, the outer surface of the protective cover may erode over time, such that unpredictable reflections may take place there. Phenomena like dust accumulation, rain, snow, bird feces, etc. may also lead to unpredictable reflections at the outer surface of the protective cover. These factors may lead to substantial stray light being present within the exterior aircraft light, when the light source(s) is/are operated. As a result, previous approaches of monitoring the performance of the light source(s) of exterior aircraft lights have not always been satisfactory.

Accordingly, it would be beneficial to provide an exterior aircraft light with integrated light output monitoring and a method for monitoring a light output of an exterior aircraft light which allow for a highly reliable determination of the performance of the light source(s) of the exterior aircraft light.

SUMMARY

Exemplary embodiments of the invention include an exterior aircraft light with integrated light output monitoring, comprising: a light source support; at least one light source, arranged on an outward facing side of the light source support; an aperture in the light source support; a light collection surface, arranged to direct an output monitoring light portion of the light, emitted by the at least one light source, through the aperture in a predefined angular range with respect to the light source support; a light detector, arranged on a back side of the light source support; and a total internal reflection optical element, arranged to direct the output monitoring light portion, having travelled through the aperture in the predefined angular range with respect to the light source support, to the light detector via total internal reflection.

Exemplary embodiments of the invention allow for a monitoring of the light output of the at least one light source that is highly independent of the ambient light conditions and highly independent of the stray light within the exterior aircraft light. In this way, a highly reliable monitoring of the performance of the at least one light source of the exterior aircraft light may be achieved. The aperture in the light source support and the total internal reflection optical element, also referred to as TIR optical element herein, may act as a two-component light filter with respect to the directions in which light rays have to pass the light source support via the aperture, in order to reach the light detector. The combination of the aperture and the TIR optical element may ensure that the output monitoring light portion, as directed through the aperture by the light collection surface, does not experience a lot of interference from ambient light and/or stray light within the exterior aircraft light. In other words, the combination of the aperture and the TIR optical element may provide for an effective way of a achieving a high signal-to-noise ratio regarding the output monitoring light portion at the light detector.

Exemplary embodiments of the invention relate to an exterior aircraft light with integrated light output monitoring. The expression of light output monitoring refers to the monitoring of the performance of the at least one light source of the exterior aircraft light. In particular, the light output monitoring may be a monitoring of the emitted light intensity of the at least one light source. It may also refer to the monitoring of an aging status/a deterioration status of the at least one light source.

The exterior aircraft light has a light detector to which the output monitoring light portion is directed. The exterior aircraft light may further have a controller or other suitable means for evaluating the measurements taken by the light detector. In particular, the controller may be configured to determine a performance status/an aging status of the at least one light source from the measurements taken by the light detector over time. The controller may carry out a determination regarding a near end of life (NEOL) condition of the at least one light source. Such indication may be conveyed to maintenance personnel and/or to a maintenance computer and/or to a board computer of the aircraft. The indication may be conveyed in any suitable manner, such as in an optical manner, e.g. via a status indicating LED at the exterior aircraft light, or via a wireless status indicating signal or via a status indicating signal, transmitted over a wired signal line. The wireless communication path and/or the wired signal line may lead to the board computer of the aircraft and/or to a temporarily connected maintenance device.

The exterior aircraft light has a light collection surface, arranged to direct an output monitoring light portion to the aperture. The light collection surface may be a reflective surface, which carries out a specular reflection or a total internal reflection on the output monitoring light portion. It is also possible that the light collection surface is refractive surface. The light collection surface may have any suitable shape for directing the output monitoring light portion to the aperture. For example, the light collection surface may be parabolic in cross-section and/or parabolic in three dimension. With a parabolic shape, the output monitoring light portion may be directed to the aperture at a particularly well-controlled angle. It is also possible that the light collection surface has a circular cross-section and/or is spherical in three dimensions. It is further possible that the light collection surface has a straight cross-section and/or is planar in three dimensions. The light collection surface may also have a suitable free form.

The exterior aircraft light has a light collection surface, arranged to direct an output monitoring light portion through the aperture in a predefined angular range with respect to the light source support. The predefined angular range extends over angles with respect to the light source support that are different from 90°. In other words, the predefined angular range does not contain the angle of 90° with respect to the light source support. The output monitoring light portion does not contain light that travels through the light source support in an orthogonal manner.

The at least one light source is a arranged on an outward facing side of the light source support. The at least one light source may be mounted directly to the outward facing side of the light source support or may be mounted to a suitable fixture, which is in turn attached to the outward facing side of light source support. In either case, the at least one light source is arranged to one side of the light source support. Said one side may be referred to as the outward facing side of the light source support. It may also be referred to as the external side or as the first side of the light source support.

The light detector is arranged on a back side of the light source support. In other words, the light detector is arranged on the other side of the light source support, as compared to the at least one light source. The light detector may be mounted directly to the back side of light source support or may be mounted to a suitable fixture, which is in turn attached to the back side of the light source support. The back side of the light source support may also be referred to as the aircraft facing side or as the inward facing side or as the second side of the light source support.

The exterior aircraft light has at least one light source. The exterior aircraft light may have exactly one light source or may have a plurality of light sources, arranged on the outward facing side of light source support. In the latter case, the light collection surface may be arranged to direct a portion of light of one of the plurality of light sources or of some of the plurality of light sources or of all of the plurality of light sources to the aperture. Regardless of whether light from all or only some or only one of the plurality of light sources is used as the output monitoring light portion, a highly reliable estimate of the performance of the at least one light source may be achieved. This is because it may be assumed for many implementations of exterior aircraft lights that the plurality of light sources deteriorate/age similarly over time.

According to a further embodiment, the total internal reflection optical element has a light transmissive body, which is arranged and configured to have the output monitoring light portion enter the light transmissive body, to reflect the output monitoring light portion at at least one total internal reflection surface, and to have the output monitoring light portion exit the light transmissive body towards the light detector. The light transmissive body may have exactly one total internal reflection surface or may have a plurality of total internal reflection surfaces, such as two or three or four or more total internal reflection surfaces. The total internal reflection optical element is arranged in such a way that the output monitoring light portion, having travelled through the aperture in the predefined angular range with respect to the light source support, is incident on the single total internal reflection surface, in case there is exactly one total internal reflection surface, or incident on the first total internal reflection surface, in case there are a plurality of total internal reflection surfaces. Depending on the predefined angular range, in which the output monitoring light portion has travelled to the aperture, the total internal reflection optical element may have a suitable offset with respect to the aperture. In other words, the total internal reflection optical element may not be centered with respect to an aperture axis, which runs through the center of the aperture perpendicular to the light source support. Further, the total internal reflection optical element is arranged and configured in such a way that the output monitoring light portion hits the single total internal reflection surface, in case there is exactly one total internal reflection surface, or the first total internal reflection surface, in case there are a plurality of total internal reflection surfaces, at an angle greater than the critical angle of the light transmissive body. The expression of the light transmissive body being arranged and configured to have above described properties may also be worded as the light transmissive body being arranged and shaped to have the described properties.

According to a further embodiment, the total internal reflection optical element is configured to direct the output monitoring light portion to the light detector via a plurality of instances of total internal reflection. In particular, the total internal reflection optical element may be configured to direct the output monitoring light portion to the light detector via two or three or four or more instances of total internal reflection. Each instance of total internal reflection may be achieved by a respective total internal reflection surface of the total internal reflection optical element. Each instance of total internal reflection may act as an additional filtering stage with respect to the angle at which the output monitoring light portion travels through the aperture of the light source support. For example, in case two instances of total internal reflection take place, the aperture, the first total internal reflection surface, and the second total internal reflection surface may form a three-component filter with respect to the angle at which the output monitoring light portion travels through the aperture. With an increasing number of instances of total internal reflection, a more effective filtering of ambient light and/or stray light within the exterior aircraft light may be achieved and a higher signal-to-noise ratio for the output monitoring light portion may be achieved. By choosing a suitable number of instances of total internal reflection, a beneficial trade-off between a good signal-to-noise ratio, a manageable complexity of the geometry of the total internal reflection optical element, and a compact implementation may be achieved.

According to a further embodiment, the total internal reflection optical element comprises a prism, wherein the prism has two total internal reflection surfaces that are angled at a prism angle of between 100° and 130° with respect to each other. In particular, the two total internal reflection surfaces may be angled at a prism angle of between 110° and 120° with respect to each other. Such a prism may allow for a particularly convenient implementation of a total internal reflection optical element that provide two instances of total internal reflection for the output monitoring light portion. A particularly good trade-off between manageable complexity and good filtering out of ambient light and/or stray light within the exterior aircraft light may be achieved. The two total internal reflection surfaces may be two portions of the prism where the output monitoring light portion experiences total internal reflection. The two total internal reflection surfaces may be separate surfaces. However, it is also possible that the two total internal reflection surfaces are provided in the form of two portions of a circumferential surface of a rotationally symmetric total internal reflection optical element. In either case, two instances of total internal reflection take place.

According to a further embodiment, the predefined angular range with respect to the light source support is between 50° and 80° with respect to the light source support. In particular, the predefined angular range with respect to the light source support may be between 60° and 70° with respect to light source support. Depending on the implementation of the light collection surface, the output monitoring light portion may travel through the aperture at selected angles within the predefined angular range or may be spread across various or all angles of the predefined angular range. For example, in case the light collection surface has a highly collimating geometry, such as a parabolic shape, it is possible that the light rays of the output monitoring light portion all travel through the aperture at substantially the same angle. For example, it is possible that the light rays of the output monitoring light portion travel through the aperture at an angle of 66° with respect to the light source support. In other implementations, it is possible that the light rays of the output monitoring light portion travel through the light source support at a selected angular interval within the predefined angular range. For example, it is possible that the light rays of the output monitoring light portion travel through the aperture at angles of between 64° and 68° with respect to the light source support. With the predefined angular range having angles that are significantly different from 90°, the output monitoring light portion travels through the aperture in a very different manner as compared to much of the ambient light, which—in many illumination scenarios—hits the light source support of the exterior aircraft light at angles around 90°.

According to further embodiment, the aperture has a cross-sectional extension of between 1 mm and 5 mm. In particular, the aperture may have a cross-sectional extension of between 2 mm and 3 mm. With these values, a good trade-off between allowing a substantial amount of light for the output monitoring light portion through the light source support and providing an effective shutter against much of the ambient light and the stray light within the exterior aircraft light may be achieved. The term cross-sectional extension may refer to the largest extension of the opening through the light source support. This may be the diameter of the opening for a circular aperture and may be the diagonal of the opening for a rectangular/square aperture.

According to a further embodiment, the total internal reflection optical element is made of silicone or made of PMMA (polymethyl methacrylate). Both silicone and PMMA are transparent materials that are well-suited for implementing a total internal reflection optical element. With silicone having a refracting index of 1.41 and a critical angle of about 45.2° and with PMMA having a refracting index of 1.48 and a critical angle of 42.2°, both materials are well-suited for cooperating with the predefined angular range of the output monitoring light portion and conveniently implementing one or more total internal reflection surfaces for the given values for the predefined angular range.

According to a further embodiment, the light source support is a printed circuit board. In this way, the light source support may be a stable structure for supporting the at least one light source and the light detector, while providing a suitable framework for providing the electric connections for those components. Also, a printed circuit board is well-suited for enabling the provision of the aperture through the printed circuit board.

According to a further embodiment, the at least one light source is at least one LED. LED(s) are compact, power-efficient and reliable light sources and are therefore well-suited for providing the lighting capacity of exterior aircraft lights. With LED(s) being subject to aging, the integrated light output monitoring of the exterior aircraft lights according to exemplary embodiments of the invention is particularly beneficial for monitoring the behavior of the one or more LED(s) of the exterior aircraft lights.

According to a further embodiment, the at least one light source is mounted to the outward facing side of the light source support. In particular, the at least one light source may be directly mounted to the outward facing side of the light source support. Further in particular, the at least one light source may be directly mounted to the light source support, with the light source support being implemented as a printed circuit board. In this way, the electric connections of the at least one light source may be conveniently provided as part of the light source support.

According to a further embodiment, the light detector is mounted to the back side of the light source support. In particular, the light detector may be directly mounted to the back side of the light source support. Further in particular, the light detector may be directly mounted to the light source support, with the light source support being implemented as a printed circuit board. In this way, the electric connections of the light detector may be conveniently implemented as part of the printed circuit board.

According to a further embodiment, the exterior aircraft light further comprises an optical system, arranged on the outward facing side of the light source support for shaping an exterior aircraft light output from the light, emitted by the at least one light source. In particular, the at least one light source and the optical system may be arranged to cooperate to generate the light output that is desired for the exterior aircraft light in question. For example, in case the exterior aircraft light is a red-flashing beacon light, the at least one light source and the optical system may cooperate to provide a beacon light output, in particular a beacon light output that satisfies the respective regulatory requirements for beacon lights and/or the desired specifications for the beacon lights of a particular aircraft. The optical system may comprise one or more reflectors and/or one or more lenses and/or one or more shutters. Depending on the desired functionality of the exterior aircraft light, the reflector(s) and/or lens(es) and/or shutter(s) may be arranged and shaped to provide the desired exterior aircraft light output.

According to a further embodiment, the optical system comprises a lens structure arranged over the at least one light source. The lens structure may have refractive surfaces or surfaces of total internal reflection or a combination of refractive surfaces and surfaces of total internal reflection. The lens structure may be arranged over the at least one light source in such a way that it encloses the at least one light source. The lens structure may in particular be overmolded over the at least one light source. The lens structure may be made of silicone or made of PMMA or made of any other suitable transparent material.

According to a further embodiment, the light collection surface is part of the optical system. In other words, the optical system, i.e. the optical structure that is responsible for shaping the desired exterior aircraft light output from the raw light emission of the at least one light source, and the light collection surface may be an integrated optical structure. In this way, it may be possible to conveniently produce the light collection surface as part of the optical system. It may be possible to implement the light collection surface, without having to produce and/or assemble a separate part for the exterior aircraft light.

According to a further embodiment, the light collection surface is part of the lens structure, arranged over the at least one light source, and directs the output monitoring light portion towards the aperture via total internal reflection. In this way, the light collection surface may be integrated particularly well into the optical system of the exterior aircraft light.

According to a further embodiment, the optical system comprises one or more ambient light refractive surfaces and/or one or more ambient light reflective surfaces, which are arranged to divert at least some of the ambient light that would travel through the aperture in the predefined angular range with respect to the light source support. In this way, ambient light whose directivity happens to coincide with the output monitoring light portion, when travelling through the aperture, may be diverted, before interfering with the output monitoring light portion. In this way, a particularly accurate and reliable monitoring of the performance of the at least one light source of the exterior aircraft light may be achieved. The ambient light refractive surface(s) and/or the ambient light reflective surface(s) may be arranged over the light collection surface. In other words, the light collection surface may be arranged between the light source support and the ambient light refractive surface(s) and/or the ambient light reflective surface(s).

According to a further embodiment, the exterior aircraft light further comprises a light transmissive cover, arranged over the light source support, the at least one light source, the light collection surface, and—if present—the optical system. The light transmissive cover provides for a mechanical protection of said components of the exterior aircraft light in the highly demanding environment of an exterior aircraft light. In particular, the light transmissive cover may protect the other components of the exterior aircraft light from aerodynamic forces, excessive humidity and rain, potentially harmful gases, such as exhaust gases, and/or mechanical impacts, such as mechanical impacts of fine particles in an impinging air stream and/or impacts by birds or other animals.

According to a further embodiment, the exterior aircraft light is one of a red-flashing beacon light, a white strobe anti-collision light, a navigation light, a landing light, a take-off light, a taxi light, a runway turn-off light, a wing scan light, an engine scan light, a logo light, and a cargo loading light.

According to a further embodiment, the exterior aircraft light is a multi-functional exterior aircraft light, combining the functionalities of at least two of a red-flashing beacon light, a white strobe anti-collision light, a navigation light, a landing light, a take-off light, a taxi light, a runway turn-off light, a wing scan light, an engine scan light, a logo light, and a cargo loading light. In particular, the exterior aircraft light may combine any subset of the functionalities listed above. For example, the exterior aircraft light may be a multi-functional exterior aircraft light, combining the functionalities of any two or of all of a red-flashing beacon light, a white strobe anti-collision light, and a navigation light. In another example, the exterior aircraft light may be a multi-functional exterior aircraft light, combining the functionalities of any two, any three or of all of a landing light, a take-off light, a taxi light, and a runway turn-off light.

Exemplary embodiments of the invention further include an aircraft, comprising at least one exterior aircraft light according to any of the embodiments described herein. The aircraft may be an airplane or a rotorcraft. The aircraft may comprise exactly one or a plurality of exterior aircraft lights according to any of the embodiments described herein. In the latter case, the exterior aircraft lights in question may be of the same design or may differ from each other in their design. The additional features, modifications and effects, as described above with respect to exemplary embodiments of the exterior aircraft light, apply to the aircraft in an analogous manner.

Exemplary embodiments of the invention further include a method for monitoring a light output of an exterior aircraft light, the exterior aircraft light having at least one light source arranged on an outward facing side of a light source support, the method comprising: directing an output monitoring light portion of the light, emitted by the at least one light source, through an aperture in the light source support in a predefined angular range with respect to the light source support; and directing the output monitoring light portion, having travelled through the aperture in the predefined angular range with respect to the light source support, to a light detector, arranged on a back side of the light source support, via total internal reflection. The additional features, modifications and effects, as described above with respect to exemplary embodiments of the exterior aircraft light, apply to the method for monitoring a light output of an exterior aircraft light in an analogous manner.

BRIEF DESCRIPTION OF THE DRAWINGS

Further exemplary embodiments of the invention are described below with respect to the accompanying drawings, wherein.

DETAILED DESCRIPTION

Figure 1:
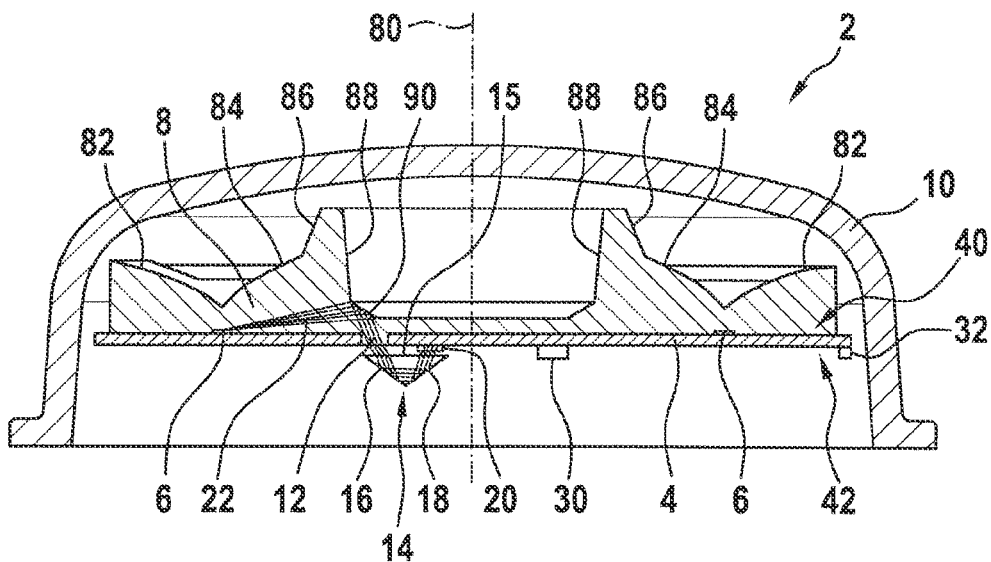
FIG. 1 shows an exterior aircraft light according to an exemplary embodiment of the invention in a schematic cross-sectional view, with the depicted exemplary light rays illustrating the monitoring of the light output of the exterior aircraft light.

FIG. 1 shows an exterior aircraft light 2 according to an exemplary embodiment of the invention in a schematic cross-sectional view. In the exemplary embodiment of FIG. 1, the exterior aircraft light 2 is a red-flashing beacon light. In particular, the exterior aircraft light 2 of FIG. 1 is a red-flashing beacon light that may be mounted to the top or to the bottom of an aircraft fuselage. FIG. 1 shows the orientation of the exterior aircraft light 2 when mounted to the top of an aircraft fuselage. The depicted cross-sectional view of the exterior aircraft light 2 is a vertical cross-sectional view. As the exterior aircraft light 2 may a be substantially rotationally symmetric device, the depicted cross-sectional view may be any vertical cross-sectional view. For ease of explanation, it is assumed that a forward portion of the exterior aircraft light 2 is shown to the left in FIG. 1 and that a rear portion of the exterior aircraft light 2 is shown to the right in FIG. 1.

The exterior aircraft light 2 comprises a light source support 4. A plurality of LEDs 6 are mounted to the light source support 4 in an annular configuration. With FIG. 1 showing a cross-sectional view through the exterior aircraft light 2, only two LEDs 6 of the annular configuration of LEDs 6 are depicted in FIG. 1. In the exemplary embodiment of FIG. 1, the light source support 4 is a printed circuit board, and the plurality of LEDs 6 are directly mounted to the printed circuit board and receive their operating power via the conductors of the printed circuit board. The light source support 4 is supported by a housing of the exterior aircraft light 2 or by the fuselage of the aircraft. It may be attached to either of these structures via a suitable fixture, which is not shown in FIG. 1 for clarity of illustration.

The plurality of LEDs 6 are located on an outward facing side 40 of the light source support 4. The outward facing side 40 of the light source support 4 may also be referred to as the external side or as the first side of the light source support 4.

The exterior aircraft light 2 further comprises an optical system 8, which is arranged over the plurality of LEDs 6 on the outward facing side 40 of the light source support 4. In the exemplary embodiment of FIG. 1, the optical system 8 is a rotationally symmetric structure that is arranged over the plurality of LEDs 6. The optical system 8 is a lens structure that has various optically active surfaces for affecting the light emitted by the plurality of LEDs 6. The optically active surfaces form an annular lens structure around a center axis 80 of the optical system 8. In this way, the individual light outputs of all of the plurality of LEDs 6 are subject to substantially the same optical set-up along the annular configuration.

The optical system 8 comprises an outward directing total internal reflection surface 82 and an inward directing total internal reflection surface 84. The outward directing total internal reflection surface 82 is arranged to direct a first portion of light, emitted by the plurality of LEDs 6 and incident on the outward directing total internal reflection surface 82, outwards. In this way, a light intensity peak in and around the horizontal plane may be achieved, as is desired in red-flashing beacon lights. When looking at the left hand side of the optical system 8 of FIG. 1, the outward directing total internal reflection surface 82 directs the first portion of light towards the left, in particular in directions that are horizontal or have small angles with respect to the horizontal plane.

The inward directing total internal reflection surface 84 is arranged to direct a second portion of light, emitted by the plurality of LEDs 6 and incident on the inward directing total internal reflection surface 84, inwards, i.e. towards a center portion of the optical system 8. The second portion of light may contribute to the light intensity peak in and around the horizontal plane on the opposite side of the exterior aircraft light 2 and/or may contribute to a smaller intensity light output portion at larger angles with respect to the horizontal plane on the opposite side of the exterior aircraft light 2, as is also desired in red-flashing beacon lights. When looking at the left hand side of the optical system 8 of FIG. 1 again, the inward directing total internal reflection surface 84 directs the second portion of light towards the right.

The optical system 8 further comprises an ambient light refractive surface 86, an ambient light reflective surface 88, and a light collection surface 90. The details of these surfaces and their impact on the light monitoring of the exterior aircraft light 2 will be described below. With respect to a third portion of light, emitted by the plurality of LEDs 6 and incident on the ambient light reflective surface 88, the ambient light reflective surface 88 acts as a slightly refractive surface. The light collection surface 90 acts as a total internal reflection surface for a fourth portion of light, emitted by a selected one or selected ones of the plurality of LEDs 6 and incident on the light collection surface 90. This fourth portion of light may also be referred to as output monitoring light portion 22 herein, as will be laid out in more detail below.

In the exemplary embodiment of FIG. 1, the outward directing total internal reflection surface 82, the inward directing total internal reflection surface 84, the ambient light refractive surface 86, the ambient light reflective surface 88, and the light collection surface 90 are annular surfaces. In particular, they are partial outer surfaces of the rotationally symmetric optical system 8. As such, two respective cross-sectional portions of the outward directing total internal reflection surface 82, of the inward directing total internal reflection surface 84, of the ambient light refractive surface 86, of the ambient light reflective surface 88, and of the light collection surface 90 are depicted in FIG. 1. The optical properties of the surfaces, as described above with respect to the left hand side of the optical system 8 of FIG. 1, apply to the right hand side of the optical system 8 in a mirror-symmetric manner.

The light source support 4 further comprises an aperture 12. The light collection surface 90 is arranged and shaped to direct the output monitoring light portion 22, emitted by one or more of the plurality of LEDs 6, through the aperture 12 to a back side 42 of the light source support 4. In particular, the light collection surface 90 is arranged and shaped to direct the output monitoring light portion 22 through the aperture 12 in an angled manner with respect to the light source support 4, i.e. at an angle other than 90° with respect to the light source support 4.

On the back side 42 of the light source support 4, a light detector 20 is arranged. The light detector 20 is a device that senses an amount of light, which is incident thereon, and outputs a measurement value corresponding to the sensed amount of light. The light detector 20 may also be referred to as a light sensor. In the exemplary embodiment of FIG. 1, the light detector 20 is mounted directly to the back side 42 of the light source support 4. The back side 42 of the light source support 4 may also be referred to as the aircraft facing side or as the second side of the light source support 4 herein.

The exterior aircraft light 2 further comprises a total internal reflection optical element 14, arranged on the back side 42 of the light source support 4. The total internal reflection optical element 14, herein also referred to as TIR optical element 14, is fixed in position with respect to the light source support 4 in any suitable manner. For example, the TIR optical element 14 may be attached to the light source support 4 via a fixing rod. It is also possible that the TIR optical element 14 is molded onto the back side 42 of the light source support 4 or that the TIR optical element 14 is molded together with the optical system 8 in a joint molding operation.

In the exemplary embodiment of FIG. 1, the TIR optical element 14 is arranged and shaped to direct the output monitoring light portion 22 to the light detector 20 via two instances of total internal reflection. For this purpose, the TIR optical element 14 receives the output monitoring light portion 22 at a light entry and exit surface 15, which faces the back side 42 of the light source support 4. After having passed the light entry and exit surface 15, the output monitoring light portion 22 experiences total internal reflection at a first total internal reflection surface 16, travels through the TIR optical element 14, experiences total internal reflection at a second total internal reflection surface 18, and exits the TIR optical element 14 at the light entry and exit surface 15 towards the light detector 20. In the exemplary embodiment of FIG. 1, the TIR optical element 14 is a rotationally symmetric light transmissive body, with the two total internal reflection surfaces 16, 18 being depicted as two separate surfaces in the cross-sectional view of FIG. 1, but being in fact two portions of a revolving continuous outer surface of the light transmissive body. It is also possible that the first total internal reflection surface 16 and the second total internal reflection 18 are separate surfaces that only meet at the tip of the TIR optical element 14, facing away from the light source support 4. The first and second total internal reflection surfaces 16, 18 may also be completely separate surfaces.

The exterior aircraft light 2 further comprises a controller 30, also referred to as evaluation unit 30. The controller 30 is coupled to the light detector 20 and receives the measurement values from the light detector 20. The controller 30 interprets the measurement values of the light detector 20 as values that indicate the performance of the plurality of LEDs 6. In particular, the measurement values of the light detector 20 substantially correspond to the light intensity of the plurality of LEDs 6, and a decrease in the measurement values is interpreted by the controller 30 as a progressive aging of the plurality of LEDs 6. The controller 30 may compare the measurement values, as provided by the light detector 20, to a threshold value for determining a critical degree of aging of the plurality of LEDs 6. The threshold value may be a predefined threshold value, stored in the controller 30 during manufacturing of the exterior aircraft light 2, or may be a threshold value derived from measurements acquired during a first operation/during a calibration phase of the exterior aircraft light 2. When the measurement values from the light detector 20 are continuously below the threshold value, the controller 30 may conclude that a near end of life, NEOL, condition of the plurality of LEDs 6 is reached.

The exterior aircraft light 2 further comprises a near end of life, NEOL, indicator LED 32. The NEOL indicator LED 32 is arranged on the back side 42 of the light source support 4, close to the rear end of the light source support 4. In that position, the NEOL indicator LED 32 is visible from the outside, and maintenance personnel can check during inspection of the exterior aircraft light 2 whether the NEOL indicator LED 32 is lit up. When the controller 30 concludes that the plurality of LEDs 6 have reached a near end of life condition, the controller controls the NEOL indicator LED 32 to light up. This will indicate to maintenance personnel that the exterior aircraft light 2 or at least the light sources thereof are to be replaced.

The exterior aircraft light 2 further comprises a light transmissive cover 10. The light transmissive cover 10 is arranged over the light source support 4, the plurality of LEDs 6, the optical system 8, the TIR optical element 14, the light detector 20, the controller 30, the NEOL indicator LED 32, and potentially other components not shown in FIG. 1. The light transmissive cover 10 protects the listed components with respect to the outside environment. In particular, the light transmissive cover 10 may close an interior space of the exterior aircraft light 2 with respect to a housing of the exterior aircraft light 2 or with respect to the fuselage of the aircraft or with respect to another part of the exterior skin of the aircraft. The light transmissive cover 10 may be made from any suitable transparent material, such as PMMA.

Figure 2:
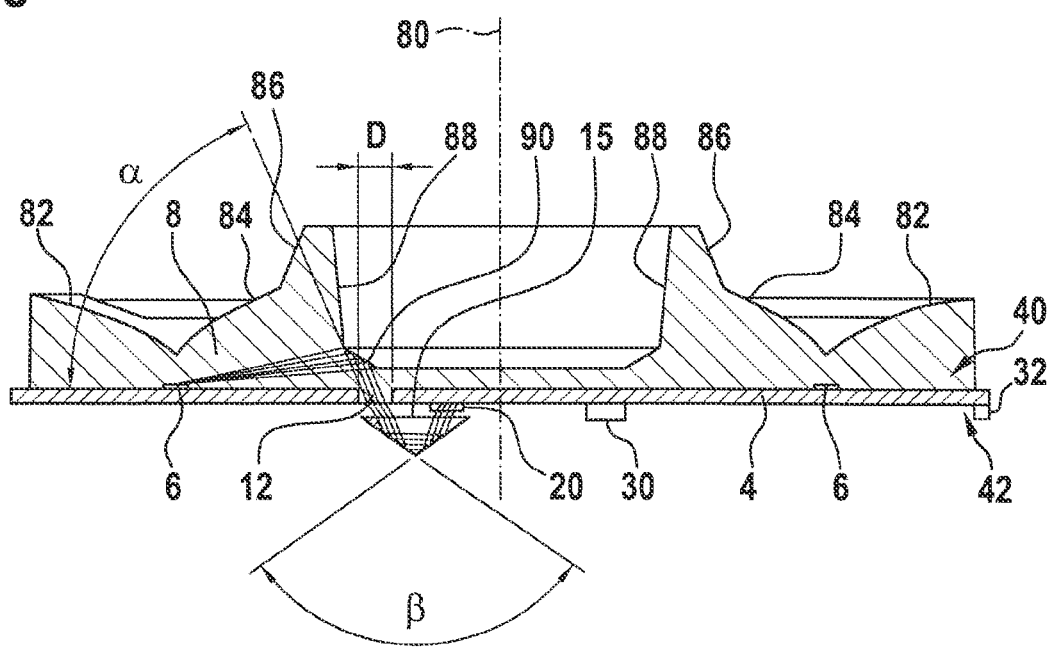
FIG. 2 shows an enlarged view of selected components of the exterior aircraft light of FIG. 1 in the same schematic cross-sectional view.

FIG. 2 shows an enlarged view of selected components of the exterior aircraft light 2 of FIG. 1 in the same schematic cross-sectional view as FIG. 1. The enlarged view of FIG. 2 is aimed at explaining the path of the output monitoring light portion 22 from the LED 6 to the light detector 20 in more detail. As stated above, the output monitoring light portion 22 is that portion of light that is emitted by one or more of the plurality of LEDs 6, that is incident on the light collection surface 90, and that is guided to the light detector 20.

In the exemplary embodiment of FIGS. 1 and 2, the light collection surface 90 is parabolic, at least in the depicted cross-section. Accordingly, the light of the output monitoring light portion 22 is collimated substantially in a single direction by the light collection surface 90, at least in the depicted cross-section. This is indicated via four exemplary light rays of the output monitoring light portion 22, which travel through the aperture 12 in parallel. In the exemplary embodiment of FIGS. 1 and 2, the light of the output monitoring light portion 22 travels through the aperture 12 at an angle of $\alpha=66°$ with respect to the light source support 4. The angle of $\alpha=66°$ is within a predefined angular range with respect to the light source support 4, wherein the predefined angular range allows for an oblique path through the light source support 4 and allows for a beneficial downstream light path, as will be explained below.

In the exemplary embodiment of FIGS. 1 and 2, the aperture 12 is circular in cross-section and has a diameter D of 2.5 mm. With this extension, the aperture 12 may allow for a substantial amount of light, coming from the LED(s) 6 and having been reflected by the light collection surface 90, to pass through the aperture 12, while blocking a large amount of ambient light and stray light within the exterior aircraft light 2 from reaching the back side 42 of the light source support 4 and potentially interfering with the measurements of the light detector 20.

As stated above, the TIR optical element 14 provides for two instances of total internal reflection for the output monitoring light portion 22. In particular, the output monitoring light portion 22 experiences a first instance of total internal reflection at the first total internal reflection surface 16 and a second instance of total internal reflection at the second total internal reflection surface 18. In the exemplary embodiment of FIGS. 1 and 2, the first total internal reflection surface 16 and the second total internal reflection surface 18 are angled at a prism angle of $\beta=113°$. With the output monitoring light portion 22 travelling through the aperture 12 at an angle of $\alpha=66°$ and with the TIR optical element 14 being arranged in such a way that the light entry and exit surface 15 is parallel to the back side 42 of the light source support 4, the output monitoring light portion 22 has an angle of incidence of $57.5°$ on the first total internal reflection surface 16.

In the exemplary embodiment of FIGS. 1 and 2, the TIR optical element 14 is made from silicone. The silicone, which is used in the exemplary embodiment of FIGS. 1 and 2, has a refracting index of 1.41 and a critical angle of about $45.2°$ for total internal reflection at the border between silicone and air. With above derived angle of incidence of $57.5°$, the angle of incidence of the output monitoring light portion 22 on the first total internal reflection surface 16 is greater than the critical angle of $45.2°$. The output monitoring light portion 22 experiences total internal reflection at the first total internal reflection surface 16. On the basis of similar considerations, the output monitoring light portion 22 experiences total internal reflection at the second total internal reflection surface 16 and reaches the light detector 20.

It can be seen from above considerations that the output monitoring light portion 22 is to travel through the aperture 12 at angles that enable the light to reach the first total internal reflection surface 16, that lead to total internal reflection at the first total internal reflection surface 16, that enable the light to then reach the second total internal reflection surface 18, and that lead to total internal reflection at the second total internal reflection surface 18. For all of these conditions to be fulfilled, only a selected, comparably small angular interval with respect to the light source support 4 can be chosen for the output monitoring light portion 22. the aperture 12, the first total internal reflection surface 16, and the total internal reflection surface 18 act as a multi-component filter that only passes on light, arriving at the aperture within said selected, comparably small angular interval, to the light detector 20. While the light collection surface 90 may be configured to direct a substantial amount of light from one or more of the plurality of LEDs 6 through the aperture 12 within said selected, comparably small angular interval, most of the ambient light and the stray light within the exterior aircraft light is blocked by said multi-component filter. Only ambient light and/or stray light that happens to reach the aperture 12 within said selected, comparably small angular interval may interfere with the monitoring of the performance of the LEDs 6. A high signal-to-noise ratio for the monitoring of the performance of the LEDs 6 may be achieved.

It is understood that the given values for the angles $\alpha$ and $\beta$ work well for the given arrangement of the plurality of LEDs 6, the given position of the light collection surface 90, the given position of the aperture 12, the given position of the TIR optical element 14, and the given material of the TIR optical element 14. With different arrangements of components and different materials for the TIR optical element 14 and, potentially, for the optical system 8, other angles $\alpha$ and $\beta$ may have to be chosen. As a general rule, however, it has been found that angles $\alpha$ within a predefined angular range of between $60°$ and $70°$ work particularly well for various implementation scenarios. In many implementation scenarios, these angles are steep enough to allow substantial amounts of light to pass through the aperture 12, while being shallow enough conveniently implement one or two instances of total internal reflection in a compact envelope on the back side 42 of the light source support 4.

Figure 3A:
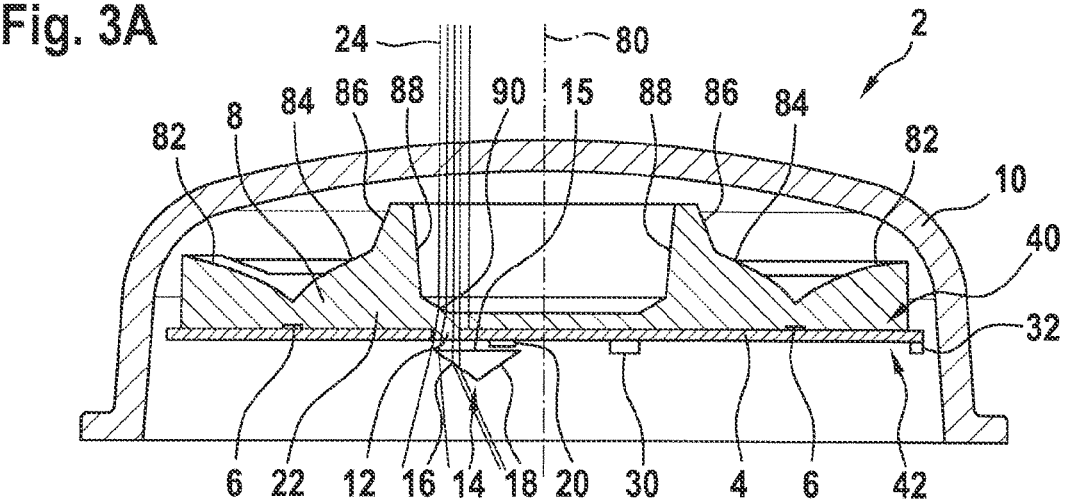
FIG. 3A shows the exterior aircraft light of FIG. 1 in the same schematic cross-sectional view, with the depicted exemplary light rays illustrating the handling of a first exemplary portion of ambient light.
Figure 3B:
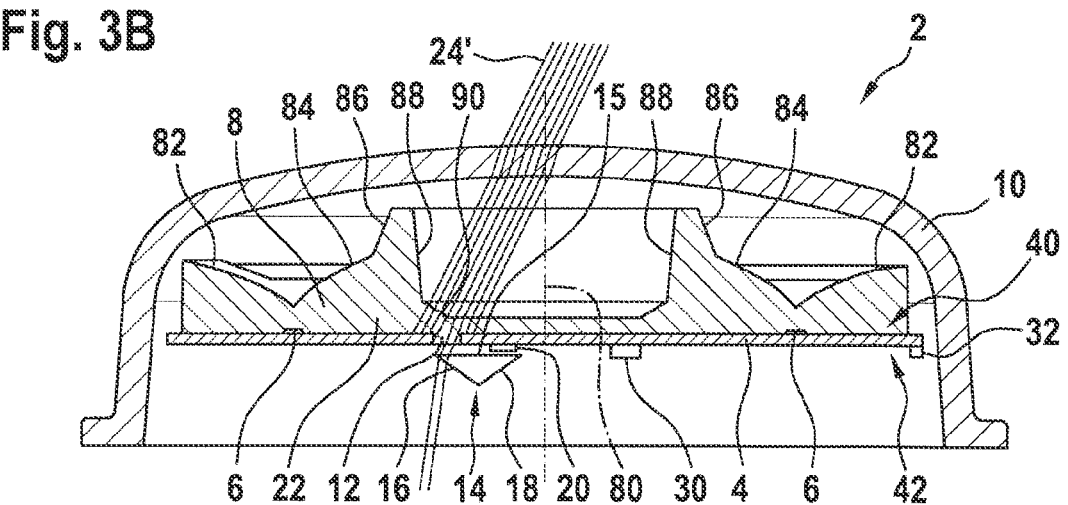
FIG. 3B shows the exterior aircraft light of FIG. 1 in the same schematic cross-sectional view, with the depicted exemplary light rays illustrating the handling of a second exemplary portion of ambient light.
Figure 3C:
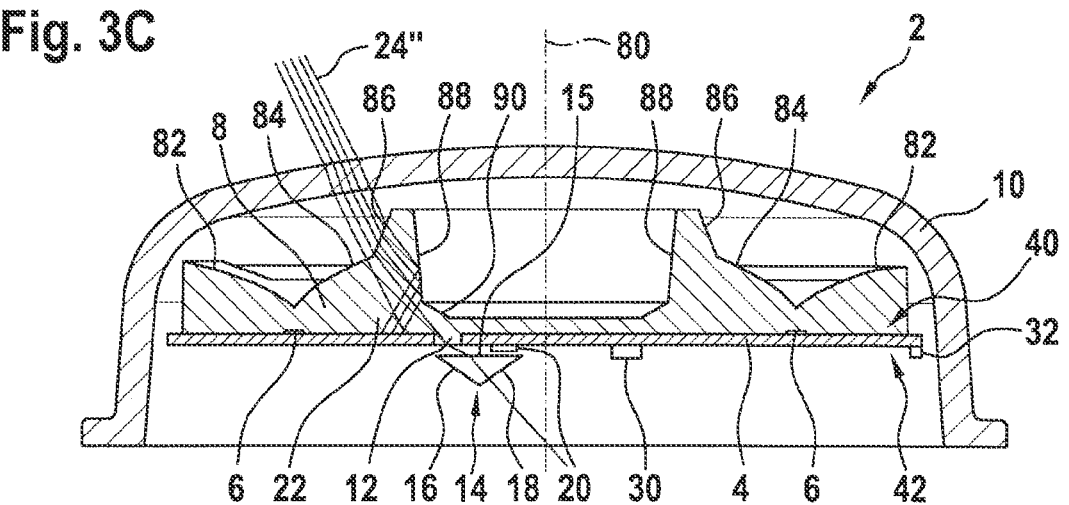
FIG. 3C shows the exterior aircraft light of FIG. 1 in the same schematic cross-sectional view, with the depicted exemplary light rays illustrating the handling of a third exemplary portion of ambient light.

FIGS. 3A, 3B, and 3C show the exterior aircraft light 2 of FIG. 1 in the same schematic cross-sectional view and illustrate the handling of first, second, and third exemplary ambient light portions 24, 24', and 24" by the exterior aircraft light 2.

In FIG. 3A, a first exemplary portion 24 of ambient light is depicted via five exemplary light rays. The first exemplary portion 24 of ambient light has an original direction that is substantially orthogonal to the light source support 4. While part of the light of the first exemplary portion 24 is blocked by the light source support, the remaining light either misses the TIR optical element 14 or is incident on the first total internal reflection surface 16 at angles that are far smaller than the critical angle. No light of the first exemplary portion 24 experiences total internal reflection at the first total internal reflection surface 16. The light rays of the second exemplary portion 24' of ambient light, as depicted in FIG. 3B, are handled in a similar manner. Part of the second exemplary portion 24' of ambient light is blocked by the light source support 4, and part of the second exemplary portion 24' of ambient light makes it through the aperture 12, but does not have a direction that would allow for total internal reflection at the first total internal reflection surface 16. The latter part of the second exemplary portion 24' of ambient light exits the TIR optical element through the first total internal reflection surface 16 and cannot interfere with the output monitoring light portion 22 at the light detector 20.

FIG. 3C shows a third exemplary portion 24" of ambient light, illustrated via five exemplary light rays. The third exemplary portion 24" of ambient light is potentially most detrimental to the reliable monitoring of the performance of the plurality of LEDs 6, because it originates from an angular direction that is similar to the angle $\alpha$, at which the light collection surface 90 directs the output monitoring light portion 22 through the aperture 12. Most of the light of the third exemplary portion 24" is diverted from reaching the aperture 12 by the joint re-directing action of the ambient light refractive surface 86 and the ambient light reflective surface 88. In particular, the ambient light refractive surface 86 directs much of the light of the third exemplar portion 24" towards the ambient light reflective surface 88 in such a way that it experiences total internal reflection at the ambient light reflective surface 88 and can no longer reach the aperture 12. Other parts of the third exemplary portion 24" of ambient light are blocked by the light source support 4 or make it through the aperture 12, but fail to be incident on the first total internal reflection surface 16 of the TIR optical element 14. One of the exemplary light rays travels through the TIR optical element 14 and leaves the same through the second total internal reflection surface 18, without experiencing a reflection there. While the provision of an ambient light refractive surface and/or an ambient light reflective surface may help in diverting ambient light from the aperture 12, it is stressed that such features are optional. It is also possible to provide targeted shutters for ambient light coming at angles close to the angle α. It is also possible to allow ambient light coming at angles close to the angle α to pass through the aperture 12. While such ambient light may make the determination of the performance of the LEDs 6 more difficult, the described filter set-up may still eliminate most of the ambient light and the stray light within the exterior aircraft light 2 and may therefore provide for a reliable monitoring of the light output of the LEDs 6.

FIGS. 1, 2, 3A, 3B, and 3C illustrate that the aperture 12 and the TIR optical element 14 act as a multi-component light filter. In this context, the light source support 4 around the aperture 12 acts as a shutter. The aperture 12 may therefore also be referred to as a shutter hole.

While FIGS. 3A, 3B, and 3C illustrate the handling/filtering of ambient light, similar considerations apply to the handling/filtering of stray light within the exterior aircraft light 2. Although the handling/filtering of stray light within the exterior aircraft light is not discussed in detail, the ray tracing examples of FIGS. 1, 2, and 3A to 3C provide an understandable framework that can be analogously applied to stray light.

Figure 4:
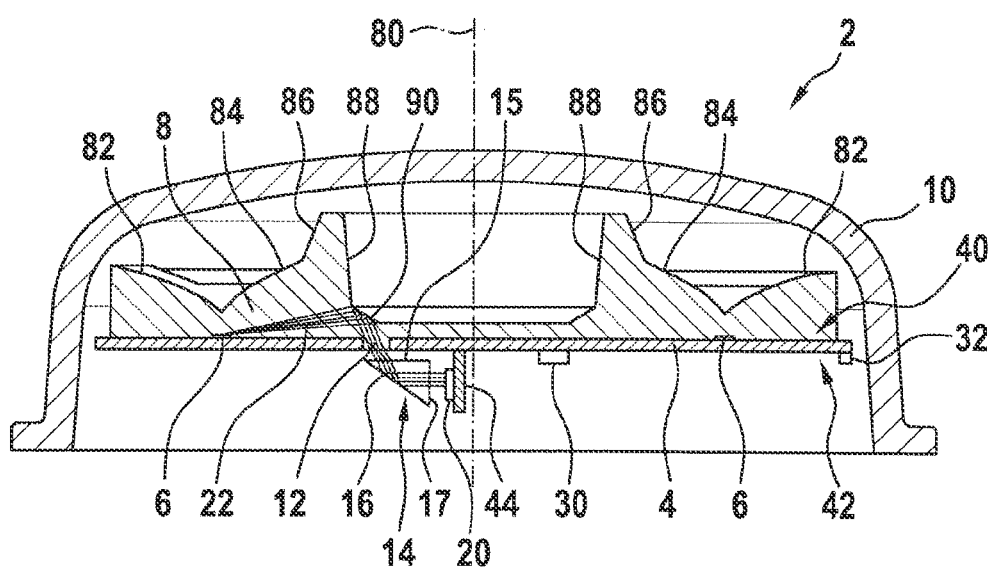
FIG. 4 shows an exterior aircraft light according to another exemplary embodiment of the invention in a schematic cross-sectional view.

FIG. 4 shows an exterior aircraft light 2 according to another exemplary embodiment of the invention in a schematic cross-sectional view. The exterior aircraft light 2 of FIG. 4 is similar to the exterior aircraft light 2 of FIGS. 1 to 3. Like components are denoted with the same reference numerals, and reference is made to their description above. The following description of FIG. 4 focusses on the differences between the exterior aircraft light 2 of FIG. 4 and the exterior aircraft light 2 of FIGS. 1 to 3.

The TIR optical element 14 of the exterior aircraft light 2 of FIG. 4 is different from the TIR optical element 14 of the exterior aircraft light 2 of FIGS. 1 to 3. The TIR optical element 14 of FIG. 4 has only one total internal reflection surface 14. In order to couple the output monitoring light portion 22 out of the TIR optical element 14 after a single instance of total internal reflection, the TIR optical element 14 has a light exit surface 17 that is separate from the light entry surface 15 and is arranged substantially perpendicular with respect to the light entry surface 15, i.e. substantially perpendicular with respect to the light source support 4. Also, the light detector 20 is arranged perpendicular to the light source support 4. In particular, the light detector 20 is arranged on a fixture 44 that protrudes substantially orthogonal from the back side 42 of the light source support 4.

The monitoring of the light output of the exterior aircraft light 2 of FIG. 4 is similar to the monitoring of the light output of the exterior aircraft light 2 of FIGS. 1 to 3. While the absence of the second total internal reflection surface 18 may lead to a less effective filtering out of ambient light and/or stray light, the resulting signal-to-noise ration of the set-up of FIG. 4 may still be large enough to reliably determine a near end of life condition of the LEDs 6.

Figure 5:
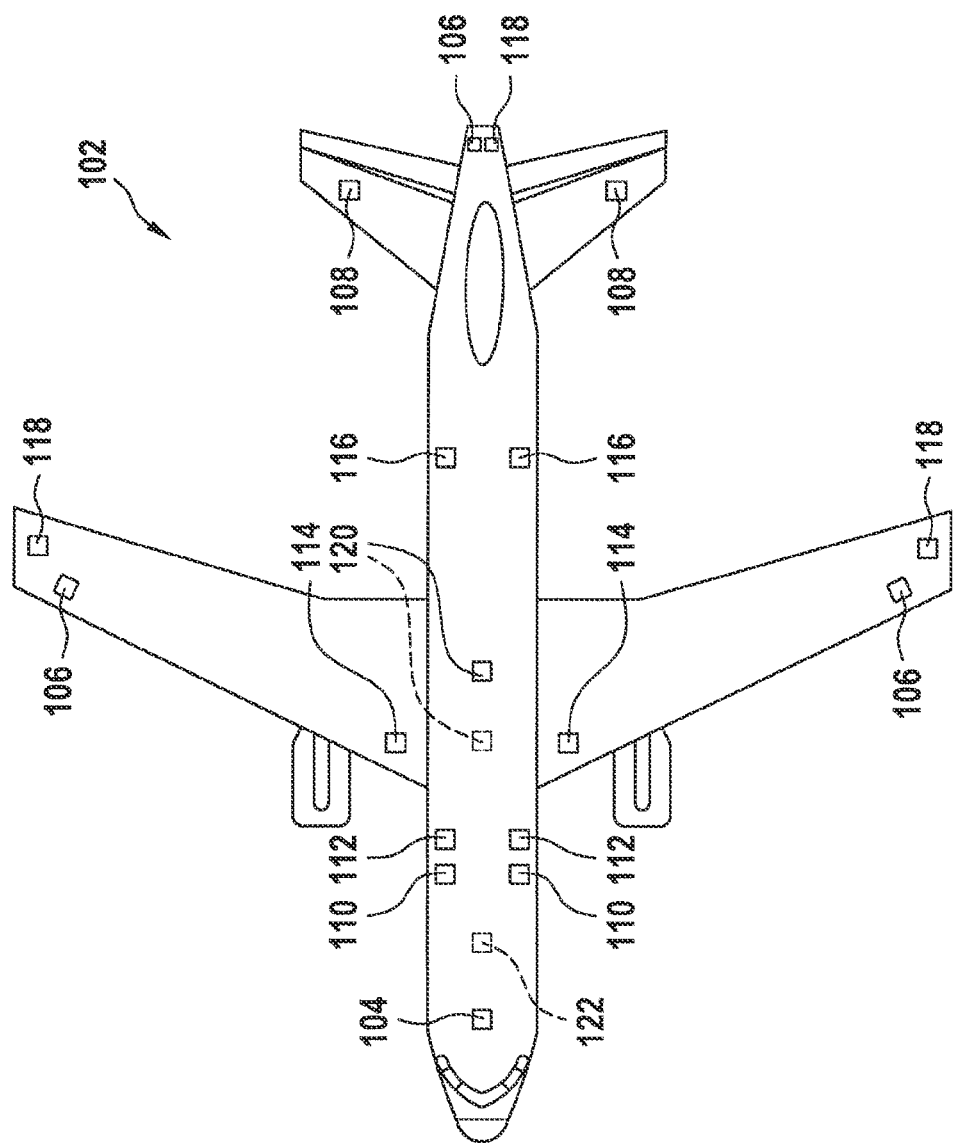
FIG. 5 shows an aircraft according to an exemplary embodiment of the invention, with potential locations for exterior aircraft lights according to exemplary embodiments of the invention being indicated.

FIG. 5 shows an aircraft 102 and various components of an exterior aircraft lighting system of the aircraft 102. The exterior aircraft lighting system comprises a control unit 104 and a variety of exterior aircraft lights. The control unit 104 is configured to control the exterior aircraft lights of the aircraft 102, as described below. The aircraft 102 is an air plane in the exemplary embodiment of FIG. 5.

The aircraft 102 of FIG. 5 has a wide variety of exterior aircraft lights. In particular, the aircraft 102 has three navigation lights 106, two logo lights 108, two wing scan lights 110, two engine scan lights 112, two runway turn-off lights 114, two cargo loading lights 116, three white strobe anti-collision lights 118, two red-flashing beacon lights 120, and a landing light 122. It is pointed out that these kinds of lights and their numbers are exemplary only and that the aircraft 102 may have additional lights that are not shown, such as a taxi light and a take-off light, which may for example be provided at the same location as the landing light 122.

The three navigation lights 106 are positioned in the left and right wing tips as well as at the tail of the aircraft 102. In normal flight conditions, each one of the navigation lights 106 emits light in one of the colors green, red and white, thus indicating to the aircraft environment if they are looking at the port side, at the starboard side, or at the tail of the aircraft. The navigation lights are normally on during all phases of the flight and in all flight conditions.

The logo lights 108 are directed to the vertical stabilizer of the aircraft 102 and are provided for illuminating the same, in particular for illuminating the logo commonly provided on the vertical stabilizer. The logo lights 108 are normally switched on for the entire duration of the flight during night flights. It is also possible that the logo lights are only used during taxiing on the airport and are normally switched off during the flight.

The wing scan lights 110 and the engine scan lights 112 are positioned on the left and right sides of the aircraft fuselage, in front of the roots of the wings of the aircraft 102. The wing scan lights 110 and the engine scan lights 112 are normally off during the flight and may be switched on periodically or upon reasonable cause by the pilots or by the crew, in order to check the wings and the engines of the aircraft 102. The runway turn-off lights 114 are positioned in the roots of the wings. They are directed forward and are normally switched off during the flight and switched on during taxiing, at least at night. The cargo loading lights 116 are positioned on the left and right sides of the aircraft fuselage, behind the wings and in front of tail structure of the aircraft 102. They are normally switched off during the flight of the aircraft 102.

The white strobe anti-collision lights 118 are positioned in the left and right wing tips as well as at the tail of the aircraft 102. The white strobe anti-collision lights 118 emit respective sequences of white light flashes during normal operation of the aircraft 102. It is also possible that the white strobe anti-collision lights 118 are only operated during night and in bad weather conditions. The red-flashing beacon lights are positioned on the top and the bottom of the fuselage of the aircraft 102. They are arranged at the height of the wings in the longitudinal direction of the aircraft 102. While one of the red-flashing beacon lights 120 is disposed on the top of the fuselage, the other one of the red-flashing beacon lights 120 is disposed on the bottom of the fuselage and is therefore shown in phantom. The red-flashing beacon lights 120 are normally switched on during the flight. Their output is perceived as a sequence of red light flashes in a given viewing direction.

The landing light 122 is attached to the front running gear of the aircraft 102, which is normally stored within the fuselage and is deployed during landing, taxiing and take off. As the landing light 122 is also arranged on the bottom of the aircraft 102, it is also shown in phantom.

The principles of monitoring the performance of the light source(s), as described in detail with respect to the exterior aircraft lights 2 of FIGS. 1 to 4, may be applied to any of the lights described above with respect to FIG. 5. The number and the arrangement of the light source(s) as well as the design of the optical system may vary between the lights and may be adapted to the particular requirements of any given one of the lights described above with respect to FIG. 5. However, irrespective of the desired light output and the chosen set-up of the exterior aircraft light in question, the principles of filtering out ambient light and stray light and providing a highly reliable measure for the performance of the light source(s), as described above with respect to FIGS. 1 to 4, may be applied to all mentioned kinds of exterior aircraft lights.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An exterior aircraft light with integrated light output monitoring, the exterior aircraft light comprising:
   a light source support for mounting to an aircraft;
   at least one light source, arranged on an outward facing side of the light source support;
   an aperture in the light source support;
   a light collection surface, arranged to direct an output monitoring light portion of the light, emitted by the at least one light source, through the aperture in a predefined angular range with respect to the light source support;
   a light detector, arranged on a back side of the light source support; and
   a total internal reflection optical element, arranged to direct the output monitoring light portion, having travelled through the aperture in the predefined angular range with respect to the light source support, to the light detector via total internal reflection.

2. The exterior aircraft light according to claim 1, wherein the total internal reflection optical element has a light transmissive body, which is arranged and configured to have the output monitoring light portion enter the light transmissive body, to reflect the output monitoring light portion at least one total internal reflection surface, and to have the output monitoring light portion exit the light transmissive body towards the light detector.

3. The exterior aircraft light according to claim 1, wherein the total internal reflection optical element is configured to direct the output monitoring light portion to the light detector via a plurality of instances of total internal reflection via two or three or four instances of total internal reflection.

4. The exterior aircraft light according to claim 1, wherein the total internal reflection optical element comprises a prism, wherein the prism has two total internal reflection surfaces that are angled at a prism angle ($\beta$) of between 100° and 130° with respect to each other.

5. The exterior aircraft light according to claim 1, wherein the predefined angular range with respect to the light source support is between 50° and 80 with respect to the light source support.

6. The exterior aircraft light according to claim 1, wherein the aperture has a cross-sectional extension of between 1 mm and 5 mm.

7. The exterior aircraft light according to claim 1, wherein the total internal reflection optical element is made of silicone or PMMA.

8. The exterior aircraft light according to claim 1, the light source support is a printed circuit board.

9. The exterior aircraft light according to claim 1,
   wherein the at least one light source is at least one LED; or
   wherein the at least one light source is mounted to the outward facing side of the light source support; or
   wherein the light detector is mounted to the back side of the light source support.

10. The exterior aircraft light according to claim 1, further comprising:
    an optical system, arranged on the outward facing side of the light source support for shaping an exterior aircraft light output from the light, emitted by the at least one light source;
    wherein the optical system comprises a lens structure arranged over the at least one light source.

11. The exterior aircraft light according to claim 10, wherein the light collection surface is part of the optical system, and
    wherein the light collection surface is part of the lens structure arranged over the at least one light source and directs the output monitoring light portion towards the aperture via total internal reflection.

12. The exterior aircraft light according to claim 10, wherein the optical system comprises an ambient light refractive surface and/or an ambient light reflective surface, arranged to divert at least some of the ambient light that would travel through the aperture in the predefined angular range with respect to the light source support.

13. The exterior aircraft light according to claim 10, wherein:
    the exterior aircraft light is one of a red-flashing beacon light, a white strobe anti-collision light, a navigation light, a landing light, a take-off light, a taxi light, a runway turn-off light, a wing scan light, an engine scan light, a logo light, a cargo loading light, and a multi-functional exterior aircraft light, combining the functionalities of at least two of a red-flashing beacon light, a white strobe anti-collision light, a navigation light, a landing light, a take-off light, a taxi light, a runway turn-off light, a wing scan light, an engine scan light, a logo light, and a cargo loading light.

14. An aircraft comprising:
    at least one exterior aircraft light according to claim 1.

15. A method for monitoring a light output of an exterior aircraft light, the exterior aircraft light having at least one light source arranged on an outward facing side of a light source support for mounting to an aircraft, the method comprising:
    directing an output monitoring light portion of the light, emitted by the at least one light source, through an aperture in the light source support in a predefined angular range with respect to the light source support; and
    directing the output monitoring light portion, having travelled through the aperture in the predefined angular range with respect to the light source support, to a light detector, arranged on a back side of the light source support, via total internal reflection.

* * * * *